(12) United States Patent
Mansbridge

(10) Patent No.: US 6,882,456 B2
(45) Date of Patent: Apr. 19, 2005

(54) LASER PULSE SHAPING DEVICE

(75) Inventor: John Mansbridge, Eastleigh (GB)

(73) Assignee: Roke Manor Research Limited, Romsey (GB)

( * ) Notice: Subject to any disclaimer, the term of this patent is extended or adjusted under 35 U.S.C. 154(b) by 0 days.

(21) Appl. No.: 10/275,817

(22) PCT Filed: May 10, 2001

(86) PCT No.: PCT/EP01/05364

§ 371 (c)(1),
(2), (4) Date: Jun. 9, 2003

(87) PCT Pub. No.: WO01/86768

PCT Pub. Date: Nov. 15, 2001

(65) Prior Publication Data

US 2004/0021926 A1 Feb. 5, 2004

(30) Foreign Application Priority Data

May 12, 2000 (GB) ............................................ 0011423

(51) Int. Cl.[7] ............................. G02F 1/01; G02B 26/00
(52) U.S. Cl. ...................................... 359/239; 359/264
(58) Field of Search ........................ 359/238–40, 245–6, 359/298–9, 303, 315, 320, 264

(56) References Cited

U.S. PATENT DOCUMENTS

| | | | | |
|---|---|---|---|---|
| 4,812,776 A | | 3/1989 | Sasaki ........................ | 359/336 |
| 4,971,417 A | | 11/1990 | Krinsky et al. ............. | 359/333 |
| 5,126,994 A | * | 6/1992 | Ogawa et al. .............. | 369/116 |
| 5,483,372 A | | 1/1996 | Green, Jr. ................... | 398/175 |
| 5,581,387 A | * | 12/1996 | Cahill ......................... | 398/100 |
| 5,594,583 A | | 1/1997 | Devaux ....................... | 398/181 |
| 6,577,782 B1 | * | 6/2003 | Leaird et al. ................ | 385/15 |

FOREIGN PATENT DOCUMENTS

| | | |
|---|---|---|
| GB | 2305042 | 3/1997 |
| JP | 63-28088 | 2/1988 |
| JP | 5-142592 | 6/1993 |
| JP | 11-261487 | 9/1999 |
| WO | WO 89/07352 | 8/1989 |
| WO | WO97 30527 A | 8/1997 |

OTHER PUBLICATIONS

Weiner A.M.: "Femtosecond Optical Pulse Shaping and Processing"—Progress in Quantum Electronics, Pergamon Press, Oxford, GB, vol. 19, No. 3, 1995 pps 161–237; XP000653086; ISSN 0079–6727; p. 232, paragraph 4; Figure 5B.
Verluyten L. et al: "Laser Pulse Stretching Via Enhanced Closed Loop Control with Slow Q Switching" Nuclear Instruments & Methods in Physics Research, Section—A: Accelerators, Spectrometers, Detectors and Associated Equipment, North–Holland Publishing Company Amsterdam, NL; vol. A292, No. 2, Jul. 1, 1990, pps 313–318, XP000137272 ISSN: 0168–9002, Figure 1.
Yang W. et al: "Real–Time Adaptive Amplitude Feedback in an AOM–Based Ultrafast Optical Pulse Sahping System", IEEE Photonics Technology Letters, IEEE Inc., New York, US; vol. 11, No. 12, Dec. 1999, pps 1665–1667, XP000926819, ISSN: 1041–1135, the whole document.

* cited by examiner

Primary Examiner—Jordan M. Schwartz
Assistant Examiner—Jessica Stultz
(74) Attorney, Agent, or Firm—Crowell & Moring LLP

(57) ABSTRACT

A pulse shaping apparatus for shaping an input optical pulse into an output optical pulse having substantially constant optical power, includes a modulator that acts upon the input optical pulse in response to a control signal. A sampling unit samples a portion of the input or output pulse and generates a sample signal that corresponds to the optical power of the input or output optical pulse. In a preferred embodiment, the sampling unit includes a power splitter that splits off sample portion of the input or output pulse, and directs the sample portion to the photodetector which generates the sample signal. Processing of the sample signal may be performed in either an analog or digital form.

17 Claims, 6 Drawing Sheets

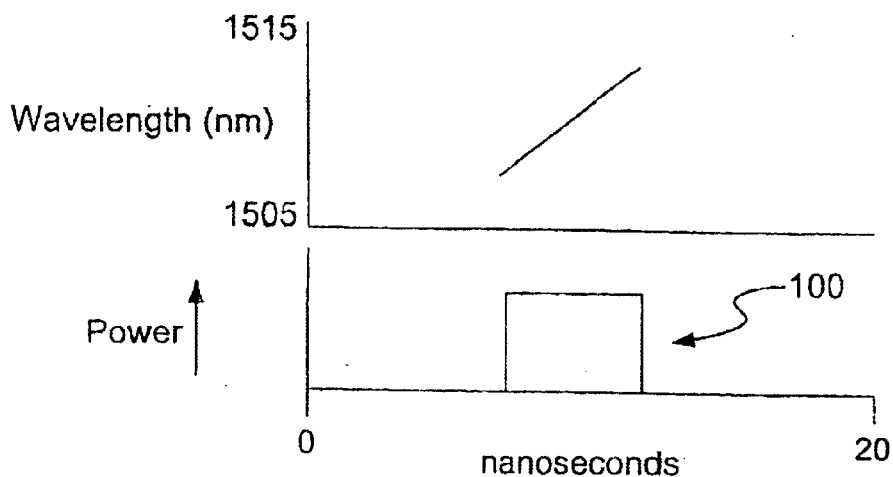
PRIOR ART *Fig. 1*   Ideal Pulse Required
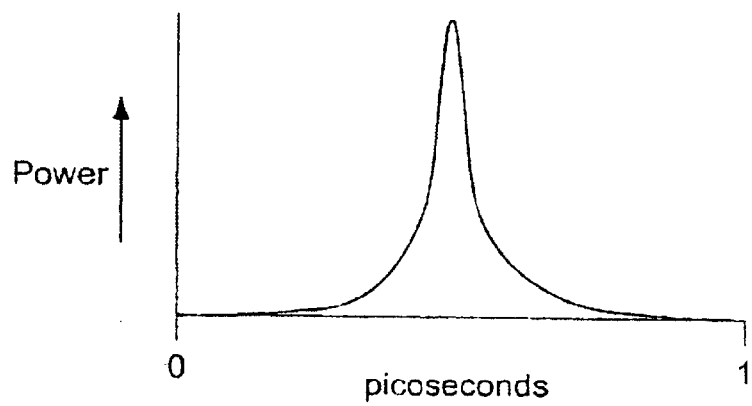
PRIOR ART *Fig. 2*   Ultra-Short Laser Pulse
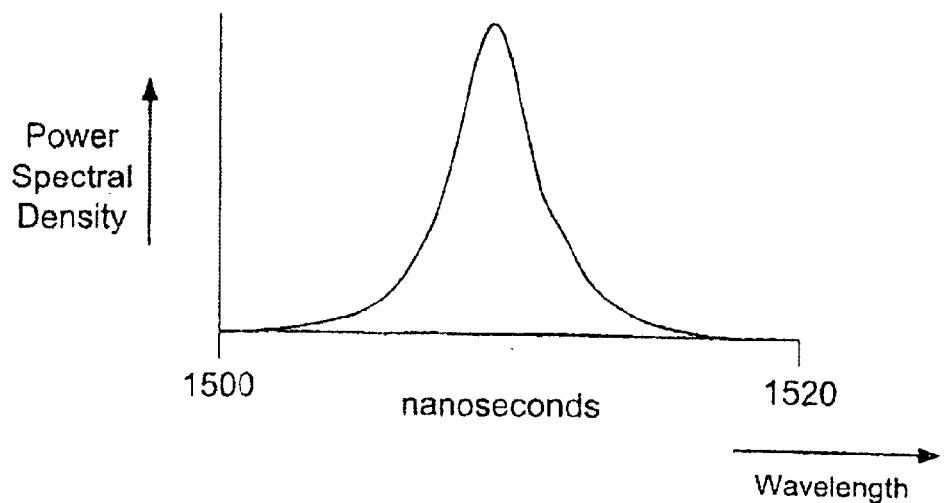
PRIOR ART *Fig. 3*   Spectrum of Pulse

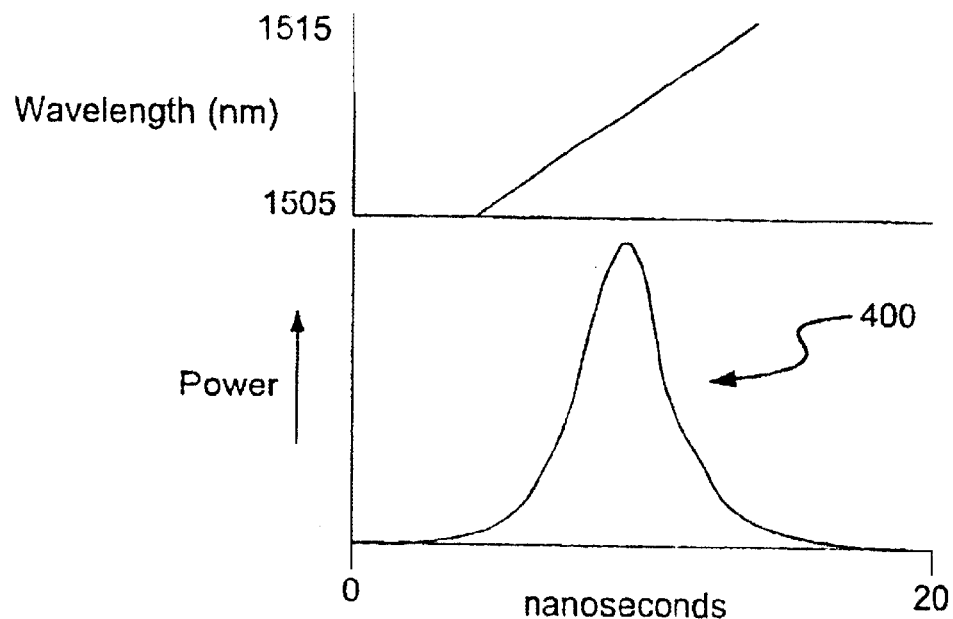
PRIOR ART Fig. 4 Pulse after Dispersive Element
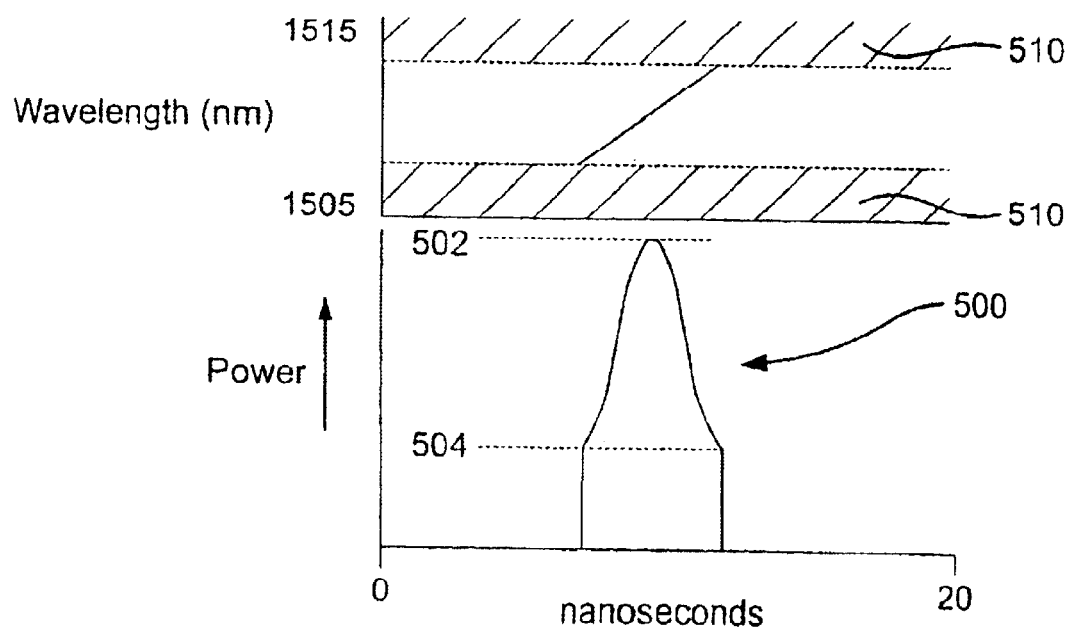
PRIOR ART Fig. 5 Truncated Pulse

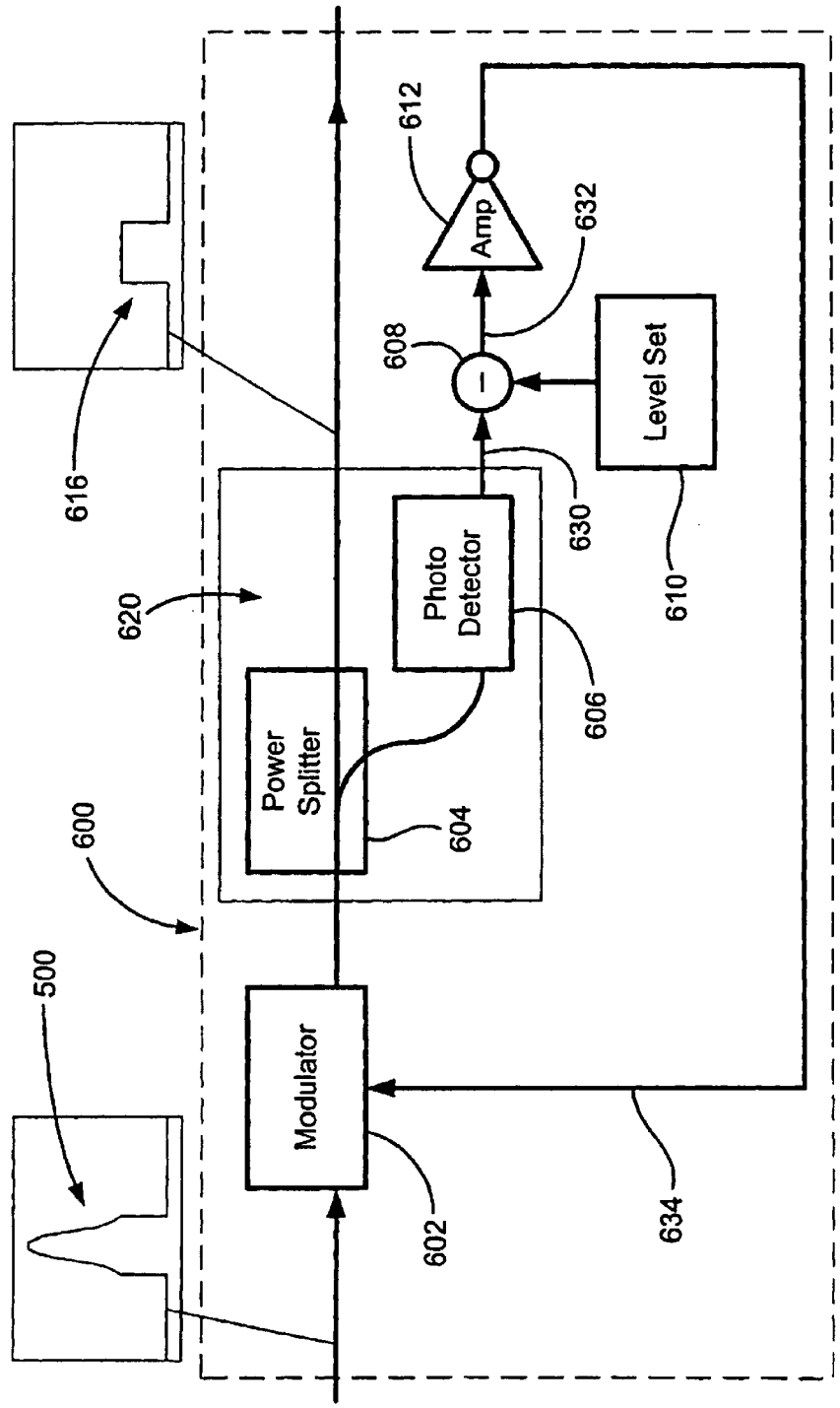
Fig.6 Pulse Shaping Approach (Closed Loop)

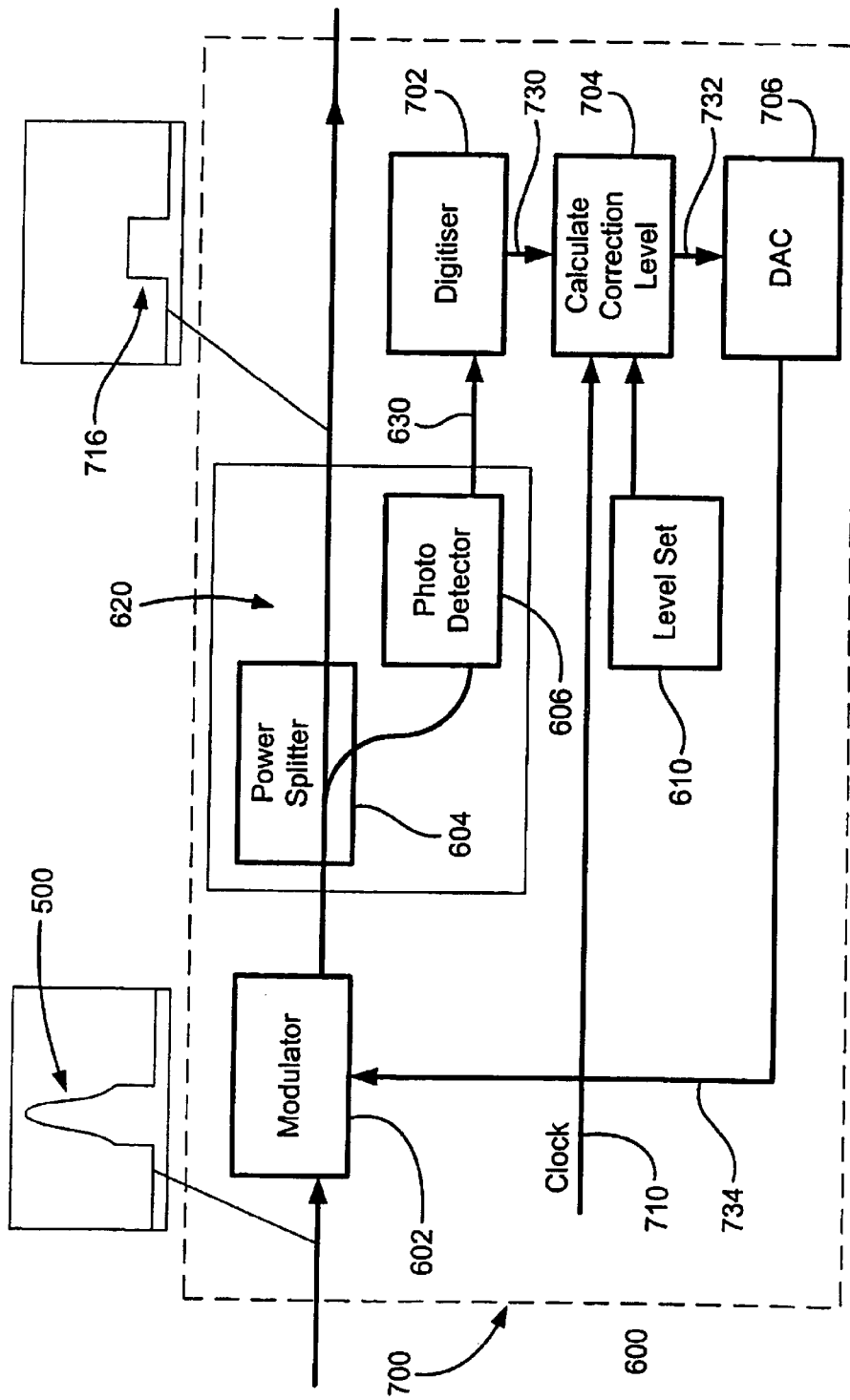
Fig. 7 Pulse Shaping Approach (Digital Loop)

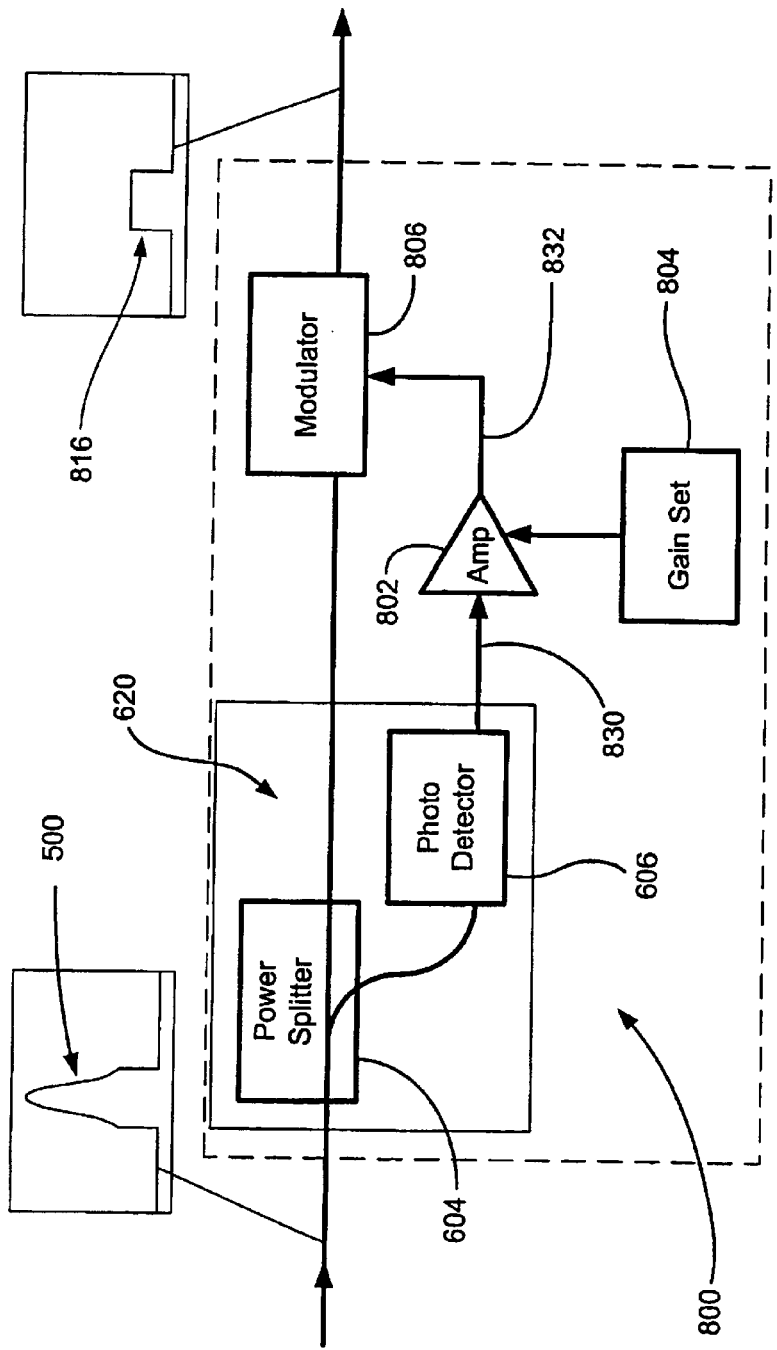
Fig. 8 Pulse Shaping Approach (Feed-forward)

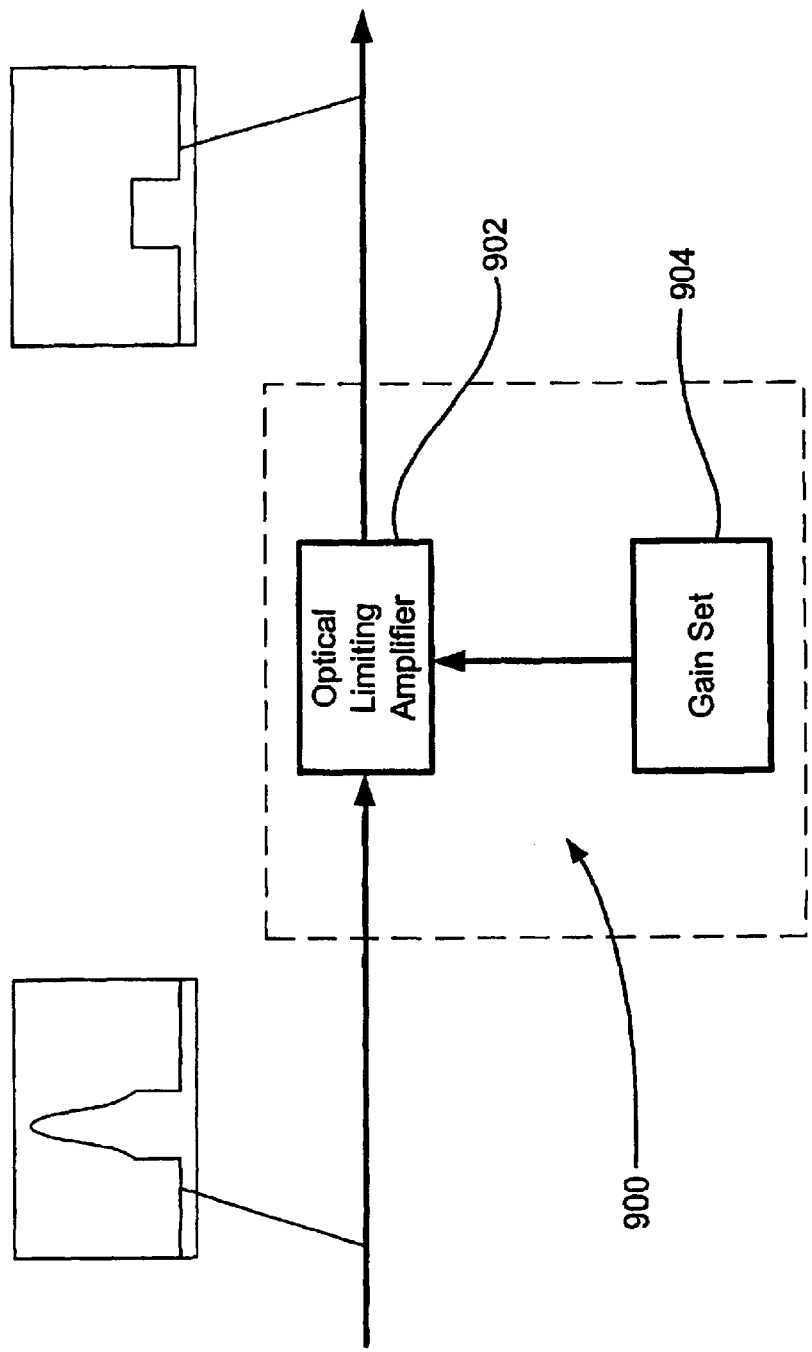
Fig. 9 Pulse Shaping Approach (Limiting Amplifier)

LASER PULSE SHAPING DEVICE

BACKGROUND OF THE INVENTION

The present invention relates to a pulse shaping means. In particular the pulse shaping means is suitable for shaping the mater pulse associated with an optical backplane device.

The invention has application in the development of new architectures for optical switching applied to high-speed digital communication routers/switches.

UK Patent Application No. 9930163.2—"Data Compression Apparatus and Method Therefor" describes the operation of an optical backplane, for example an optical fiber, in an optical switching system. In particular, 9930163.2 discloses a compression method for converting packets of data at 10 Gbits/s to compressed packets at 1.28 Tbits/s. The compressed packets are then time multiplexed onto the fiber optic backplane of a device such as an IP router or ATM switch.

An essential part of a compression method is the generation of a chirped master laser pulse. This is typically a 5 nanosecond (ns) pulse that chirps over 5 nanometers (nm) wavelength. The ideal pulse shape, the pulse having substantially constant power, is illustrated in FIG. 1, using the parameters above.

The chirped master laser pulse can be generated using a laser that directly produces a chirp. However, the currently preferred method is to use a laser that has a very narrow pulse and to convert this to a chirp by propagating it through a dispersive transmission medium, for example a length of optical fiber or a Bragg fiber grating.

FIG. 2 shows the pulse profile for an ultra-short laser pulse approximately 100 femtoseconds (fs) in length. The spectrum of this pulse is shown in FIG. 3. The pulse can then be passed through a dispersive medium to generate a chirped pulse as illustrated in FIG. 4. The chirped pulse can be passed through an optical filter to block wavelengths at start and end of the pulse to give a pulse that chirps over the required 5 nm of wavelength.

The resulting truncated pulse is illustrated in FIG. 5, which may be compared to the ideal pulse in FIG. 1. In blocking wavelengths higher and lower than the 5 nm bandwidth the optical filter also attenuates the pulse at times corresponding to these wavelengths 510. It can be seen that the truncated, chirped pulse 500 does not have a constant power level.

The difference in power between the peak 502 and the edges 504 of the pulse in FIG. 5 can be reduced if a narrower ultra-short pulse is used, thus widening the spectrum of the pulse. However, this approach has the disadvantage that the amount of original laser power that is lost, in the truncation process increases as the ultra-short pulse is shortened.

SUMMARY OF THE INVENTION

It is therefore an object of the invention to enable a constant power truncated pulse to be generated without the additional power loss associated with simply using a narrower ultra-short pulse.

In accordance with one aspect of the present invention, there is provided a pulse shaping apparatus for shaping an input optical pulse into an output optical pulse having substantially constant optical power. The apparatus comprises a modulator which acts upon the input optical pulse under the control of a control signal to provide the output pulse; and means for generating the control signal. The means for generating the control signal itself comprises a sampling means for sampling a portion of the output pulse and generating a sample signal corresponding to the optical power of the output optical pulse; and means for generating the control signal for the modulator in dependence upon the value of the sample signal. The modulator acts on the input optical pulse before the sampling means samples the output optical pulse. The apparatus further includes a digitizing means, a memory means, a processing means and a digital to analog converting means. The sample signal is digitized and the digitized output pulse shape is stored in the memory means. The processing means calculates a plurality of feedback values for the digitized pulse shape. The feedback values are converted to an analog feedback signal by the digital to analog converting means and the analog feedback signal is used as the control signal for the modulator.

The plurality of feedback values may be calculated according to a predetermined offset signal, and may be stored in the memory means. The analog feedback signal ay be used with no alteration to control the modulator for a plurality of input optical pulses.

The present invention also provides another pulse shaping apparatus for shaping an input optical pulse into an output optical pulse having substantially constant optical power, the apparatus comprising a modulator which acts upon the input optical pulse under the control of a control signal to provide the output pulse; and means for generating the control signal, wherein the means for generating the control signal itself comprises a sampling mean for sampling a portion of the input pulse and generating a sample signal corresponding to the optical power of the input optical pulse; and means for generating the control signal for the modulator in dependence upon the value of the sample signal. In particular, the sampling means samples the input optical pulse before the modulator acts on the input optical pulse.

The apparatus may further include an amplifier means for amplifying the sample signal and generating an amplified signal under the control of an adjustable gain, the amplified signal being used as the control signal for the modulator. In addition, the apparatus may also include a further sampling means, subsequent to the modulator, for generating a further sample signal that is used to adjust the gain of the amplifier means. Such further sampling means may include a further power splitter means and a further photodetector, the power splitter means splitting off a further sample portion of the output pulse and directing the further sample portion to the further photodector and the further photodetector generating the further sample signal.

The sample signal may have a magnitude which is proportional to the optical power of the input or output optical pulse.

The sampling means may include a power splitter means and a photodetector, the power splitter means splitting off a sample portion of the input or output pulse and directing the same portion to the photodetector and the photodetector generating the sample signal.

The sample signal may have a magnitude which is proportional to the optical power of the input or output optical pulse.

A predetermined offset signal may be subtracted from the sample signal to give an error signal. The predetermined offset signal may have a predetermined magnitude.

The apparatus may further include an amplifier means, wherein the error signal is applied to the amplifier means to generate an amplified signal that is used as the control signal for the modulator.

The magnitude of the sample signal and/or any further sample signal may be an electrical signal. In particular, the magnitude of the sample signal and/or any further sample signal may each be expressed as a voltage.

Other objects, advantages and novel features of the present invention will become apparent from the following detailed description of the invention when considered in conjunction with the accompanying drawings.

BRIEF DESCRIPTION OF THE DRAWINGS

FIG. 1 shows the shape of an ideal master laser pulse;

FIG. 2 shows a pulse profile of an ultra-short laser pulse;

FIG. 3 shows the power spectrum of the ultra-short laser pulse in FIG. 2;

FIG. 4 shows the shape of a chirped pulse after propagation through a dispersive medium;

FIG. 5 shows the truncated shape of the chirped pulse of FIG. 4 after wavelengths at the beginning and the end of the pulse have been filtered off;

FIG. 6 shows a closed loop pulse shaping system-according to a first embodiment of the present invention;

FIG. 7 shows a digital loop pulse shaping system according to a first embodiment of the present invention;

FIG. 8 shows a feed-forward pulse shaping system according to a second embodiment of the present invention; and FIG. 9 shows a pulse shaping system using a limiting amplifier according to a third embodiment of the present invention.

DETAILED DESCRIPTION OF THE INVENTION

In the following drawings like reference signs refer to similar features.

FIGS. 1 to 5 illustrate the preparation of an incoming truncated chirped laser pulse and have been discussed previously.

FIG. 6 shows a pulse shaping system 600 in which the input to the system is a truncated optical pulse 500 arriving on an optical fiber. The truncated pulse 500 is passed through a modulator 602. The modulator 602 attenuates the signal according to a control voltage 634. Following the modulator 602, a sample of the optical power is taken from the fiber by a sampling means 620 and converted to a sample signal 630. Typically the sampling means includes an optical power splitter 604 and a photodetector 606; the power splitter 604 splitting off a small portion of the optical power and supplying the small portion to the photodetector 606 and the photodetector 606 converting the portion of optical power into the sample signal 630. The sample signal 630 corresponds to the optical power in the incoming pulse 500.

In the following, it is assumed that the sample signal 630 is an electrical signal, having a voltage proportional to the optical power. An offset voltage 610, equivalent to the desired power level, is then subtracted 608 from the sample signal 630. The output of the subtraction process represents an error signal 632 that can be used to control the modulator 602.

The error signal 632 is supplied to a high-gain, inverting amplifier 612, which is used to drive the modulator 602. In choosing an inverting amplifier, it has been assumed that the modulator 602 is such that increasing drive voltage gives reduced attenuation. In the above approach, the behavior of the modulator 602 is controlled by the amplified feedback signal 634 from the previous pulse in a closed loop.

In the closed loop configuration 600, the sampling means 620, subtractor 608 and amplifier 612 form part of a feedback path for the modulator 602, which has then effect of trying to keep the output signal level 616 from the modulator 602 at the set level 610 regardless of the input level. Generally, the modulator 602 can attenuate but cannot provide gain. Therefore, when the sample signal 630 is too low the amplified error signal 634 will be positive but this will not increase the signal level 616 out of the modulator 602.

The advantage of using closed loop feedback is that it is very simple to implement and robust to variations in factors such as amplifier gain. However, to fully correct a truncated pulse 500, the feedback loop needs to have a very wide bandwidth, typically greater than 1 gigaHertz (GHz). This means that the time-delay around the entire feedback loop must be less than typically 0.5 ns. A sub-nanosecond time-delay imposes many constraints on the implementation of closed loop feedback. Indeed, the closed loop pulse shaping system 600 may need to be integrated into a single package, simply to avoid the delay in the interconnection becoming too great.

Where the truncated pulses are repetitive, the problem of delays in the closed feedback loop can be overcome by means of a digital feedback loop. A digital feedback loop allows the system to adapt over a number of pulses rather than having to adapt during each pulse.

A digital feedback loop 700 is illustrated in FIG. 7. In a similar manner to. FIG. 6, a truncated pulse 500 is passed through a modulator 602 and the modulator 602 attenuates the pulse according to a control voltage 734. Following the modulator 502, a sample of the optical power is taken from an optical fiber by a sampling means 620 and converted to a sample signal 630. Rather than feeding directly into a subtractor 608, the sample signal 630 from the sampling means 620 is digitized by a digitized 702. The digitized pulse shape 730 is then stored in memory (not shown). A processing means 704, for example a computer, then calculates the feedback value 732 for each sample point in the pulse shape 730 according to the desired power level 610. The feedback values 732 thus calculated are then passed to a digital to analog converter (DAC) 706 that is arranged to apply the required, analog, feedback voltages 734 to subsequent pulses. Typically the calculated feedback values 732 or the analog feedback voltages 734 are stored in the memory means (not shown). In this way, the digital feedback loop 700 can adapt the analog feedback voltages 734 over a period of time that is very much longer than the length of the pulses.

A second embodiment of the present invention implements a feed-forward approach 800 as illustrated in FIG. 8. In feed-forward, the pulse power is measured before the pulse shape is corrected, using a sampling means 620. The power measurement 830 is then applied to an amplifier 802 with a controllable gain 804. The output of the amplifier 832 is then used to drive a modulator 806, the attenuation of which is proportional to the applied voltage.

In the feed-forward configuration, the gain 804 must be adjusted to give the best results. Once set, the gain 804 must be maintained as the system temperature changes. In addition, if the pre-correction pulse characteristics change, the gain 804 may have to be adjusted. In both circumstances it may be necessary to incorporate a further sampling means after the modulator to monitor the quality of the pulse correction and to adjust the amplifier gain as necessary.

It may not be possible or convenient to use a modulator that has a linear relationship between applied voltage and attenuation. In which case the quality of the correction that results will deteriorate unless the non-linearity is corrected. The advantage of a feed-forward approach is that the delay between the modulator control signal and the pulse can be matched (by putting a delay in the relevant path). Thus a feed-forward circuit does not have the loop delay, constraints of the closed feedback approach.

A third embodiment of the present invention, involves the use of an optical limiting amplifier or a limiting medium. Suitable limiting media include liquid crystals and neodymium-doped glasses and semiconductors, indeed any of a range of materials whose absorption depends upon the optical power level. This configuration is illustrated in FIG. 9. The truncated pulse 500 passes through an optical limiting amplifier 902 that saturates at a certain power level. The power level is then effectively capped at the saturation level.

The effectiveness of the limiting configuration depends on the saturation characteristics of the amplifier or medium, for example whether the medium resonates or the saturation response is too slow. In addition the saturation point of the amplifier may itself have a wavelength dependence which will translate into a variation of the pulse level.

It will be understood that the present invention applies to pulse shaping of optical pulses in general rather than solely to the implementation described in the UK Patent Application 9930163.2. Furthermore, the wavelength ranges and nanosecond time-scales are used as illustrations only and are not intended to limit the scope of the invention to the values quoted.

While various signals, such as the sample signal 832, have been discussed in the context of electrical signals, it will be understood that equivalent non-electrical signals, such as optical or acoustic signals, could be used without departing from the scope of the present invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof

What is claimed is:

1. A pulse shaping apparatus for shaping an input optical pulse into an output optical pulse having substantially constant optical power, the apparatus comprising:

a modulator which acts upon the input optical pulse under the control of a control signal to provide the output optical pulse; and control signal means for generating the control signal, said control signal means including a sampling means for sampling a portion of the output optical pulse and generating a sample signal corresponding to optical power of the output optical pulse, and means for generating the control signal for the modulator in dependence upon the value of the sample signal; wherein, the modulator acts on the input optical pulse before the sampling means samples the output optical pulse;

the apparatus further includes a digitizing means a memory means, a processing means and a digital to analog converting means;

the sample signal is digitized and the digitized sample signal is stored in the memory means;

the processing means calculates a plurality of feedback values for the digitized sample signal, which feedback values are converted to an analog feedback signal by the digital to analog converting means; and the analog feedback signal is used as the control signal for the modulator.

2. An apparatus according to claim 1, wherein the plurality of feedback values are calculated according to a predetermined offset signal.

3. An apparatus according to claim 1, wherein the plurality of feedback values are stored in the memory means and the analog feedback signal is used with no alteration to control the modulator for a plurality of input optical pulses.

4. A pulse shaping apparatus for shaping an input optical pulse into an output optical pulse having substantially constant optical power, the apparatus comprising:

an optical modulator which acts upon the input optical pulse under the control of a control signal to provide the output optical pulse;

a sampling means for sampling a portion of the input optical pulse and generating sample signal corresponding to the optical power of the input optical pulse; and means for generating the control signal for the modulator in dependence upon the value of the sample signal; wherein, the sampling means samples the input optical pulse before the modulator acts on the input optical pulse.

5. An apparatus according to claim 4, further including an amplifier means for sampling the sample signal and generating an amplified signal under the control of an adjustable gain, the amplified signal being used as the control signal for the modulator.

6. An apparatus according to claim 5, further including a further sampling means subsequent to the modulator, for generating a further sample signal that is used to adjust the gain of the amplifier means.

7. An apparatus according to claim 6, wherein the further sampling means includes a further power splitter means and a further photodetector, the further power splitter means splitting off a further sample portion of the output pulse and directing the further sample portion to the further photodetector and the further photodetector generating the further sample signal.

8. An apparatus according to claim 4, wherein the sample signal has a magnitude which is proportional to the optical power of the input optical pulse.

9. An apparatus according to claim 1, wherein the sampling means includes a power splitter means and a photodetector, the power splitter means splitting off a sample portion of the input optical pulse and directing the sample portion to the photodetector and the photodetector generating the sample signal.

10. An apparatus according to claim 9, wherein the sample signal has a magnitude which is proportional to the optical power of the sampled pulse.

11. An apparatus according to claim 10, wherein a predetermined offset signal is subtracted from the sample signal to give an error signal.

12. An apparatus according to claim 11, wherein the predetermined offset signal has a predetermined magnitude.

13. An apparatus according to claim 11, further including an amplifier means, wherein the error signal is applied to the amplifier means to generate an amplified signal that is used as the control signal for the modulator.

14. An apparatus according to claim 1, wherein the sample signal is an electrical signal.

15. An apparatus according to claim 14 wherein the magnitude of the sample signal is expressed as a voltage.

16. An apparatus according to claim 6, wherein the further sample signal is an electrical signal.

17. An apparatus according to claim 16, wherein the magnitude of the further sample signal is expressed as a voltage.

* * * * *